United States Patent [19]
Roby

[11] 3,738,444
[45] June 12, 1973

[54] ANTI-THEFT SYSTEM FOR A VEHICLE

[76] Inventor: John Roby, 124 St. John's Avenue, Yonkers, N.Y.

[22] Filed: July 12, 1971

[21] Appl. No.: 161,558

Related U.S. Application Data

[63] Continuation-in-part of Ser. No. 113,369, Feb. 8, 1971, abandoned.

[52] U.S. Cl.............. 180/114, 200/43, 307/10 AT, 340/64
[51] Int. Cl............................................. B60r 25/00
[58] Field of Search ..................... 180/114; 200/43, 200/45; 307/10 AT, 10 R; 340/64

[56] References Cited
UNITED STATES PATENTS

| | | | |
|---|---|---|---|
| 3,634,697 | 1/1972 | MacFarlane | 180/114 X |
| 3,619,633 | 11/1971 | Brandon | 180/114 X |
| 3,058,092 | 10/1962 | Johnson | 340/64 |
| 3,430,058 | 2/1969 | Yoshida | 307/10 AT |
| 3,634,724 | 1/1972 | Vest | 180/114 X |
| 3,515,891 | 6/1970 | Margeson et al. | 307/10 AT |
| 3,596,243 | 7/1971 | Leibholz | 340/64 |
| 3,553,641 | 1/1971 | Moragne | 180/114 X |

*Primary Examiner*—Kenneth H. Betts
*Assistant Examiner*—David M. Mitchell
*Attorney*—Evelyn M. Sommer

[57] ABSTRACT

An anti-theft system for an automotive vehicle whereby the starter motor is energized through an electronic switch only when a command signal is applied thereto by setting a series of code switches into the proper switching states to establish a predetermined code state.

7 Claims, 2 Drawing Figures

INVENTOR.
JOHN ROBY

BY Evelyn W. Sommer

ATTORNEY

INVENTOR
JOHN ROBY

BY Evelyn W. Sommer
ATTORNEY

ANTI-THEFT SYSTEM FOR A VEHICLE

This is a continuation-in-part of application Ser. No. 113,369, filed Feb. 8, 1971, now abandoned.

The present invention relates in general to security systems for vehicles and more particularly to an anti-theft system for an automative vehicle whereby the engine cannot be started until a coded switch means is set into a predetermined code state.

There exists an urgent need for systems that will be effective to prevent thefts of motor vehicles, or at least make vehicle theft much more difficult and discouraging than it has been heretofore.

The instant invention proposes an anti-theft system which is effective to prevent starting of the propulsion engine until a predetermined code state has been set into a coded switch device. This coded switch device has a series of several multi-position switches each and every one of which must be set at an individually prescribed position in order to establish the requisite code state. The switch settings needed to establish the proper code are presumably known only to authorized persons, and the number of available setting combinations can be made sufficiently high as to preclude, for all practical purposes, any significant possibility of discovery through trial and error.

According to a preferred embodiment of the invention, the coded switch means employed has four separate switches each having ten distinct selectable switching states. Each switch can therefore be regarded as determining, by its particular setting, one digit of a four digit code, the respective switching states of all four switches collectively establishing the overall code state. Assigning numerical values from zero to nine to the settings for each switch, it can be appreciated that such switch means could be set in any one of ten thousand code states represented by the numbers in the range 0000 to 9999.

These code switches are electrically connected to one another such that when each switch is set in the switching state corresponding to the prescribed code, there exists an electrically conductive path extending through all code switches.

The conductive path is utilized for the transmission of an electric current from an electric source, such as a battery, to the control gate of a gate-controlled rectifier that is connected to the starter means. Such current is therefore a command signal established by the coded switch means, and is of such magnitude that when applied to the gate of the rectifier, it triggers the rectifier into a conductive state to energize the starter means.

To prevent tampering, the system uses protective enclosures and a protective conduit. One protective enclosure is associated with the coded switch means and contains all parts and interconnecting wiring thereof, leaving exposed only those shaft dials which must be manipulated in order to set the code for starting. These two protective enclosures are communicated with each other by a protective conduit through which extends a conductor that carries the command signal current to the rectifier gate.

For a better understanding of the invention, its advantages and uses, reference should be had to the accompanying drawings and following detailed description.

Figure 1:
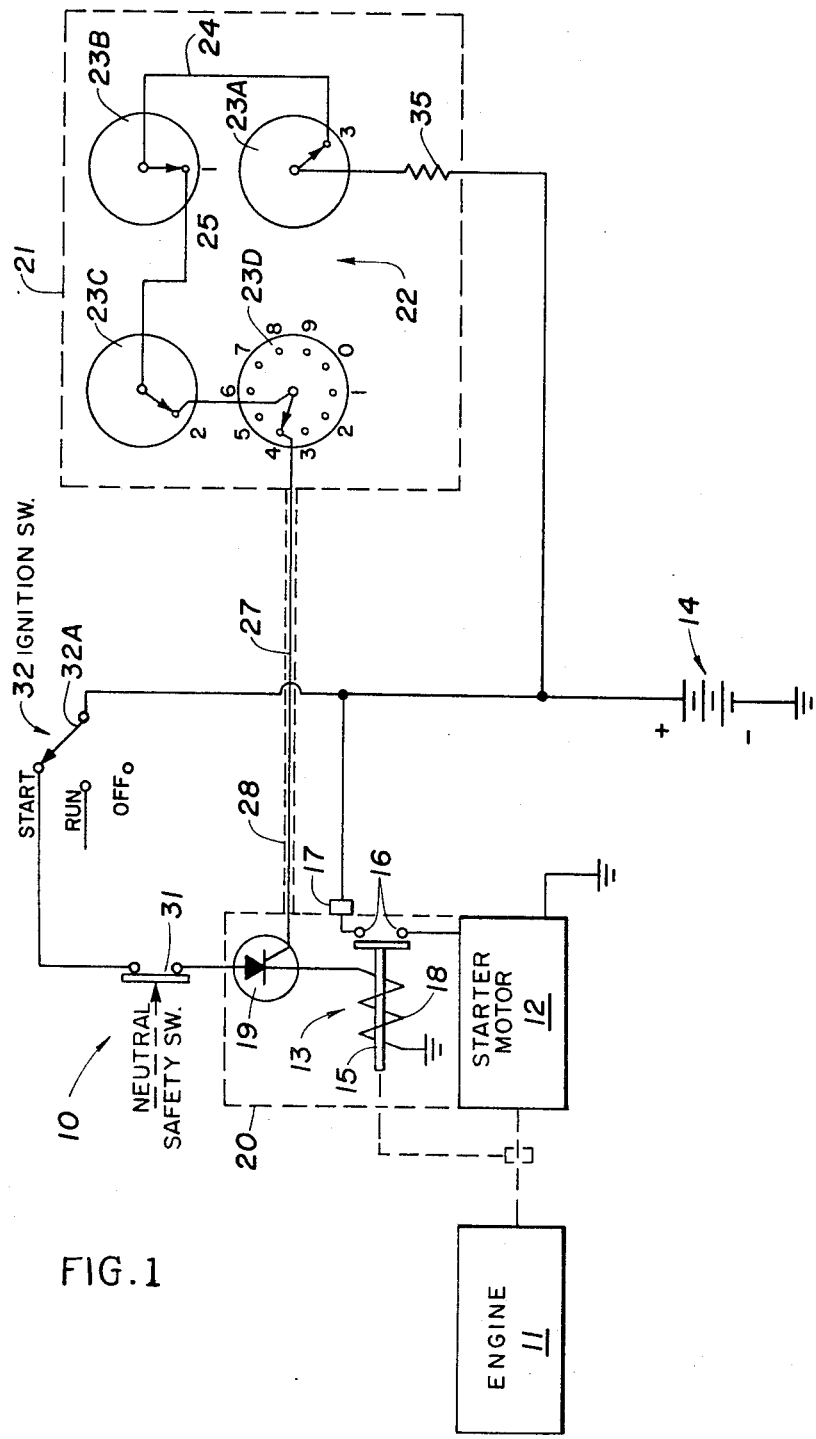
FIG. 1 is a schematic diagram illustrating an automotive vehicle anti-theft system according to a preferred embodiment of the invention.

The anti-theft system 10 exemplified in the drawing is particularly adapted for use in a conventional automobile or truck (not shown) having a propulsion engine 11 that is activated by cranking action applied by a starter motor 12.

In the typical modern automobile there is provided a solenoid actuator 13 the function of which is to shift a pinion gear (not shown) driven by starter motor 12, into meshing engagement with a ring gear mounted to the flywheel (not shown) of engine 11 to effect cranking thereof. Once engine 11 has been started, the pinion gear and hence starter 12 are disengaged from their flywheel cranking action by any one of several conventional means (not shown) and which in detail do not concern this invention.

As will be subsequently discussed in detail a plurality of multi-position switches which are series connected are utilized to establish a coded switch within the passanger compartment of a vehicle. If the required current for the starter motor 12 (as much as 20 amps) was directed to pass through such a coded switch, the physical size of its multiposition switches which would be required would result in an unworkably large coded switch and this is undesirable. Accordingly the solenoid 13 located within the engine compartment is utilized to effect a direct connection from the starter motor 12 to the battery 14. When the solenoid coils 18 are energized by a suitable electric current the solenoid plunger 15 is displaced into engagement with a pair of heavy duty switch contacts 16 thereby electrically connecting the starter motor 12 to a heavy duty battery terminal 17. As thus illustrated the solenoid 13 and starter motor 12 combination can be regarded as a starter means that activates engine 11 whenever the coil 18 of the solenoid is energized by a suitable electric current.

To discourage tampering, solenoid 13, a gate-controlled rectifier 19 and the wiring connections of these elements to one another and to the starter motor 12 are located within a protective enclosure 20. This protective enclosure 20 is located in the engine compartment of the vehicle and can be constituted in part by the housing elements normally furnished with conventional starter and solenoid assemblies.

Another protective enclosure 21 is located within the passenger compartment of the vehicle and is expediently mounted in an accessible position on the dashboard. Enclosure 21 serves to prevent tampering with a coded switch means 22 that includes four single-pole, ten-switching-state-positions code switches 23A, 23B, 23C and 23D interconnected by wire conductors 24, 25 and 26. Switches 23A–D are expediently rotary type switches and have respective armsetting shafts extending beyond enclosure 21 and equipped with means such as pointer knobs (not shown) whereby the vehicle operator can readily determine the switching state of each switch 23A–D.

A wire lead 27 connects switch 23D to the control gate of the rectifier and passes through a flexible steel tube 28 which is permanently secured at either end to the protective enclosres 20 and 21. A person who is intent on stealing the car must first locate this steel tubing, which perferably is installed in an inaccessible location, cut through it, locate the center wire lead 27, strip the insulation therefrom and jump it to the positive side of the battery. As can be appreciated this greatly increases the security of the system.

As set forth hereinbefore, the energization of solenoid coil 18 results in cranking action by motor 12 for starting engine 11. The energization of coil 18 is controlled by rectifier 19 which is a simplified species of electronic switch. The ungrounded, or "hot" terminal of coil 18 is connected to the cathod of rectifier 19, which is expediently a silicon control rectifier (SCR). The anode of rectifier 19 is connected to the positive terminal of battery 14 through a conventional automotive neutral-safety switch 31 and the ignition switch 32. Neutral-safety switch 31 is normally closed whenever the vehicle is in a safe condition for starting, i.e., in neutral rather than in any driving gear transmission state. Ignition switch 32 has an arm 32A connected to battery 14 positive terminal, the arm 32A being movable by turning the ingition key (not shown) from an OFF position to either a RUN position or a START position.

Accordingly, when ignition switch 32 is set at the START position, and switch 31 is closed, the rectifier 19 will be ready to be triggered into a conductive state to pass an energizing current through coil 18. Triggering of rectifier 19 is effected by applying to its control gate an electric current type command signal. As is the case with an SCR rectifier 19, only a momentary application of the triggering current is required to establish full anode-cathode conduction, which in the case of the invention continues until the ignition switch 32 is returned from the START position to either the RUN or OFF positions, as occurs when engine cranking is interrupted. Thus, conduction turn-off in rectifier 19 is automatic upon termination of cranking.

One of the advantageous features of the invention, and which tends to make vehicle theft more difficult is that the starter solenoid coil 18 cannot be readily jumped or by-passed as in the case of conventional automotive starting circuits but requires the application of an electric current to the control gate of rectifier 19, a fact not easily discovered by inspection.

Such electric current is supplied by the coded switch means as a command signal output thereof when, and only when the code switches 23A–D are set to establish a predetermined code state. As part of the concept of the invention, the switches 23A–D are electrically connected to one another to define an electrically conductive path extending through all switches 23A–D when each switch is set in a switching state corresponding to the required code state. Switches 23A–D collectively establish the code state of the coded switch means, and using four switches 23A–D their respective switching states can be expressed as a digit of a four digit code. In the particular example presented in the drawing, the existing switching state of each switch 23A–D can be expressed as a decimal number 0–9 corresponding to the position of its pole arm. The required code state for engine starting can thus be expressed as 3124, because the terminal connections of conductors 24, 25 and 26 are such that switch 23A must be set at state 3, switch 23B set at state 1, switch 23C set at state 2, and switch 23D set at state 4 in order to achieve current conduction from the positive terminal of battery 14, through resistor 35, all switches 23A–D and conductor 27 to gate of rectifier 19.

Resistor 35 which is located within enclosure 20 limits the gate current input to the rectifier 19 to a selected small value, for example, 0.01 amps. With such a small gate current the switching elements 23A–D of the coded switch can be desirably compact. This small gate current effectively closes the rectifier circuit intermediate the anode and cathode thereof and the necessarily high current, for example, 20 amps can be switched thereacross.

As can be appreciated by the artisan, if the switches 23A–D are set at any combination of switching states other than that defining the correct code, the current conduction path from battery 14 to the gate of rectifier 19 will be open and no command signal will be applied. The requisite code can, of course, be easily changed by making appropriate changes in the connections of conductors 24, 25, 26 to their associated switches 23A–D. With four ten position switches 23A–D, there are ten thousand possible code settings that can be made, as represented numerically by the numbers between 0000 and 9999, and only one combination, in this example 3124, gives the correct code. Consequently, for most thieves, obtaining the correct code by trial and error is impractical.

If it should be diesred to increase the degree of security, additional switches (not shown) similar to switches 23A–D can be connected in series therewith. For example, six series connected single pole, ten-switching-states switches will afford 1,000,000 possible code settings.

Figure 2:
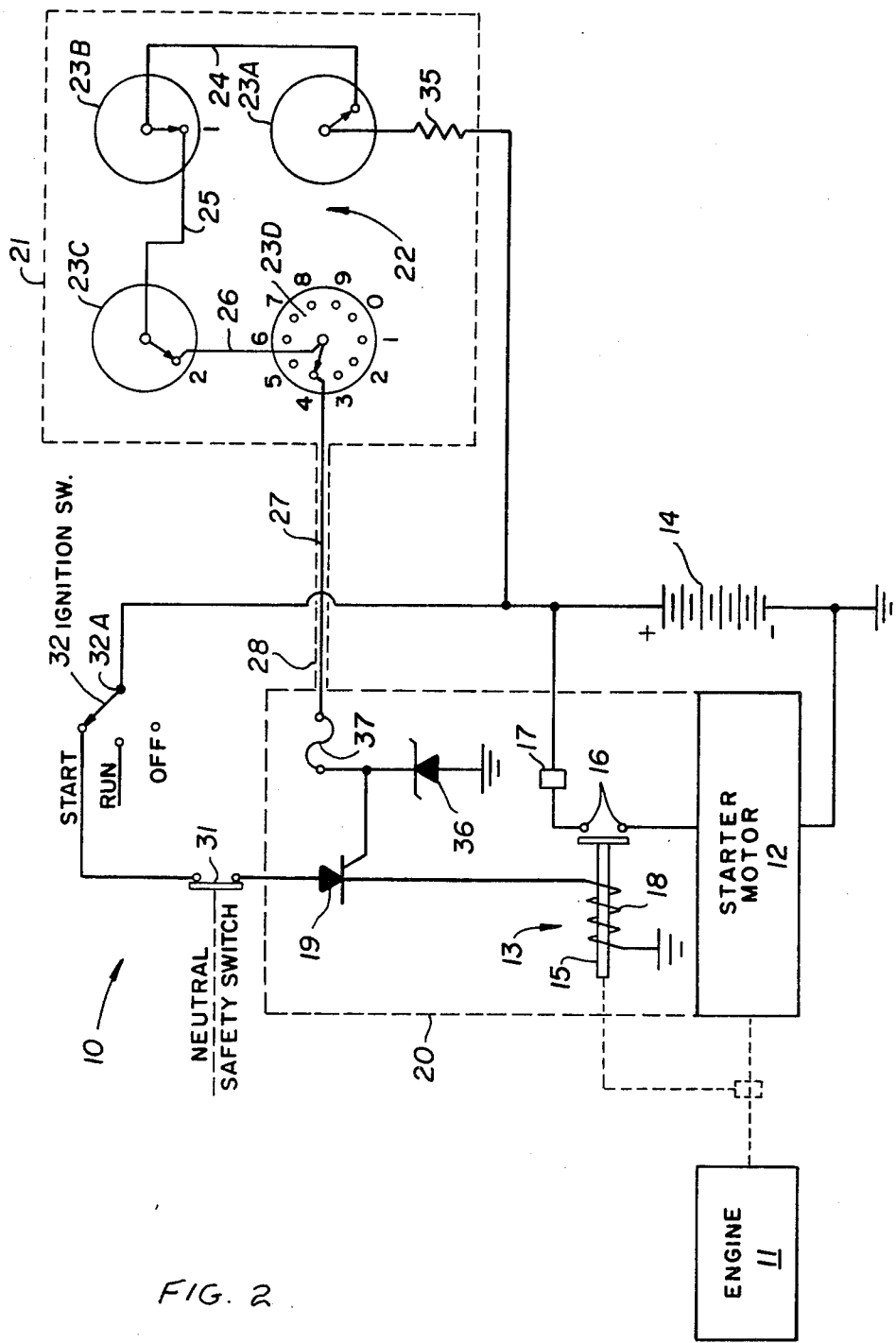
FIG. 2 is a schematic diagram partially illustrating an anti-motive vehicle anti-theft system having a second preferred embodiment.

If desired a fuse of selected rating which will allow the small current from the switching means 23A–D to flow therethrough to ground when the switching means is energized but which will blow if substantially more current is passed therethrough can be inserted into the electrical path intermediate the gate of the rectifier and the electrical lead 27 from the switches 23A–D and a grounded Zener diode 36 can be connected to this electrical path intermediate the rectifier gate and the fuse (FIG. 2). This incorporation of the fuse and Zener diode into the electrical path from the switches to the rectifier gate will prevent a thief from effectively jumping the electrical lead 27 to the positive side of the battery unless a resistor having a resistance substantially equal to the resistance of the coded switching means reisistor 35. When this equality does not exist and the electrical conductor 27 is jumped to the positive terminal of the battery the current flow through the fuse will be sufficient to blow this fuse thereby disabling the entire system. If on the other hand, the conductor 27 is jumped to the negative terminal of the battery no current will flow to the solenoid and the vehicle will not start.

From the foregoing, the artisan will realize that the invention is adapted to numerous modifications and variations to suit the needs of a particular application. However, the invention is intended to be limited only by the following claims in which I have endeavored to claim all inherent novelty.

What is claimed is:

1. An antitheft system for a vehicle having energizable starter means for activating the vehicle propulsion motor comprising a source of direct current, coded switch means adapted to be positioned within the passenger compartment of the vehicle and connected to said source and operable to establish a command signal only upon being set in a predetermined code state, means for limiting the magnitude of said command signal to a predetermined selectively small value, rectifier means including gate control means located within the engine compartment, an anode and a cathode, the starter means being connected to said cathode, means for connecting said source to said rectifier anode, means for directing said command signal having said selectively small value to said rectifier control gate for switching a current of substantially greater magnitude across said rectifier means from said anode to said cathode whereby the starter means will be energized and further including a fuse having a selected rating located proximate said rectifier means and connected to said directing means intermediate said rectifier means and said coded switch means and grounded diode means connected intermediate said fuse and said rectifier means for passing a selected current flow to ground which is below said rating when said coded switch means is set to said predetermined code state whereby if said directing means is jumped to said source the current flow through said fuse will blow the fuse and said vehicle will become inoperable.

2. An antitheft device according to claim 1 further comprising steel shielding means for encapsulating said directing means.

3. An antitheft device according to claim 2, further comprising starter means, said starter means including solenoid means having a coil and plunger means and switch means adapted to be closed by said plunger means when said plunger means is displaced by the energized coil.

4. An antitheft device according to claim 3, wherein said coded switch means comprises a plurality of series connected multiposition switches adapted to define an electrical path through said coded switch means when each of said multipole switches is selectively set corresponding to a predetermined code.

5. An antitheft system according to claim 3 including a protective enclosure associated with said rectifier means and said starter means and a protective enclosure associated with said coded switch means, said shielding means communicating with said enclosures.

6. An antitheft system according to claim 5 wherein said gate-controlled rectifier is a silicon control rectifier.

7. An antitheft system according to claim 6, wherein each of said switches of the coded switch means determines a corresponding numerical digit in the code state thereof, and the switching state of each of said switches determines the value of the respective digit.

* * * * *